US011845110B2

(12) United States Patent
Lapointe

(10) Patent No.: US 11,845,110 B2
(45) Date of Patent: Dec. 19, 2023

(54) SORTING SYSTEM AND CORRESPONDING METHOD

(71) Applicant: PREMIER TECH TECHNOLOGIES LTÉE, Rivière-du-Loup (CA)

(72) Inventor: Billy Lapointe, Rivière-du-Loup (CA)

(73) Assignee: PREMIER TECH TECHNOLOGIES LTÉE, Rivière-du-Loup (CA)

( * ) Notice: Subject to any disclaimer, the term of this patent is extended or adjusted under 35 U.S.C. 154(b) by 0 days.

(21) Appl. No.: 17/504,209

(22) Filed: Oct. 18, 2021

(65) Prior Publication Data

US 2022/0118485 A1 Apr. 21, 2022

Related U.S. Application Data

(60) Provisional application No. 63/093,366, filed on Oct. 19, 2020.

(51) Int. Cl.
*B07C 5/34* (2006.01)
*B07C 5/36* (2006.01)
(Continued)

(52) U.S. Cl.
CPC ............ *B07C 5/362* (2013.01); *B07C 5/3422* (2013.01); *B65G 43/08* (2013.01); *B65G 47/252* (2013.01); *B65G 47/28* (2013.01); *B65G 2203/0225* (2013.01); *B65G 2203/0233* (2013.01); *B65G 2203/044* (2013.01)

(58) Field of Classification Search
CPC ......... B07C 1/02; B07C 5/342; B07C 5/3422; B07C 5/362; B65G 47/28; B65G 47/252; B65G 43/08
See application file for complete search history.

(56) References Cited

U.S. PATENT DOCUMENTS 8,253,054 B2 * 8/2012 Koehler ................ B07C 5/342
700/223
8,930,015 B2 1/2015 Johnston et al.
(Continued)

FOREIGN PATENT DOCUMENTS

CN 104458744 A 3/2015
CN 207266945 U 4/2018
(Continued)

*Primary Examiner* — Joseph C Rodriguez
(74) *Attorney, Agent, or Firm* — Fish IP Law, LLP

(57) ABSTRACT

The present disclosure concerns a method for sorting items transported along a conveyance direction on an item carrier of a sorting system, the item carrier comprising a charging zone, a first detection zone, an item orientation-changing zone, a second detection zone and a sorting zone, the method comprising sequentially: loading the items on the item carrier in the charging zone; capturing a first image of the items in the first detection zone; changing an orientation of the items in the item orientation-changing zone, located downstream of the first detection zone; capturing a second image of the items in the second detection zone, located downstream of the first detection zone; identifying nonstandard items amongst the items from information derived from the first and second images; and isolating the identified nonstandard items in the sorting zone. It also concerns a corresponding sorting system.

17 Claims, 10 Drawing Sheets

(51) Int. Cl.
  *B65G 47/28* (2006.01)
  *B65G 47/252* (2006.01)
  *B07C 5/342* (2006.01)
  *B65G 43/08* (2006.01)

(56) References Cited

U.S. PATENT DOCUMENTS

| | | | |
|---|---|---|---|
| 9,035,210 B1 | 5/2015 | Davis | |
| 9,221,080 B2 | 12/2015 | Soler Esteban et al. | |
| 9,492,848 B1 * | 11/2016 | Davis | B07C 5/3422 |
| 9,656,301 B2 | 5/2017 | Johnston et al. | |
| 9,789,518 B2 | 10/2017 | Iino | |
| 10,016,790 B1 | 7/2018 | Travis et al. | |
| 10,625,306 B1 * | 4/2020 | Nichols | G06F 16/51 |
| 2014/0142745 A1 * | 5/2014 | Johnston | B07C 5/36 700/223 |
| 2018/0243800 A1 * | 8/2018 | Kumar | G06N 20/00 |
| 2019/0193118 A1 * | 6/2019 | Ripley | G06V 10/255 |
| 2020/0160011 A1 * | 5/2020 | Wagner | B65G 21/2036 |
| 2022/0041379 A1 * | 2/2022 | Zatopek | B07C 1/04 |
| 2022/0234078 A1 * | 7/2022 | Bartrom | B07C 5/28 |

FOREIGN PATENT DOCUMENTS

| | | |
|---|---|---|
| EP | 706838 A1 | 4/1996 |
| EP | 2921432 A1 | 9/2015 |
| ES | 2429395 A1 | 11/2013 |
| FR | 2966369 A1 | 4/2012 |
| JP | 2014097455 A | 5/2014 |
| KR | 101836444 B1 | 12/1899 |
| WO | 2011154017 A1 | 12/2011 |
| WO | 2016198804 A1 | 12/2016 |
| WO | 2017017751 A1 | 2/2017 |
| WO | WO-2021156459 A1 * | 8/2021 |

* cited by examiner

SORTING SYSTEM AND CORRESPONDING METHOD

PRIOR APPLICATION

The present application claims priority from U.S. provisional patent application No. 63/093,366, filed on Oct. 19, 2020, and entitled "SORTING SYSTEM AND CORRESPONDING METHOD", the disclosure of which being hereby incorporated by reference in its entirety.

TECHNICAL FIELD

The technical field relates to sorting systems, and more particularly to picking and sorting systems comprising image devices and item-picking systems and to corresponding methods.

BACKGROUND

Sorting systems are well known in the art. For some products, particularly those that require visual inspection, the systems require manual removal and are labor intensive. These systems also, in addition to being expensive to operate, are not as accurate as desired at an acceptable speed and/or require longer periods of sorting to increase accuracy. Moreover, some products to be sorted have irregular shapes, which require the products to be manipulated and/or returned to expose different portions thereof (for instance opposed faces thereof).

In view of the above, there is a need for a sorting system and for a corresponding sorting method which would be able to overcome or at least minimize some of the above-discussed prior art concerns.

BRIEF SUMMARY

It is therefore an aim of the present invention to address the above-mentioned issues.

According to a general aspect, there is provided a method for sorting items transported along a conveyance direction on an item carrier of a sorting system, the item carrier comprising a charging zone, a detection zone and a sorting zone, the method comprising sequentially: loading the items on the item carrier in the charging zone; physically distancing the items from one another in the charging zone to form item rows therein, each of the item rows extending substantially transversally to the conveyance direction; capturing a first image of the items in the detection zone; capturing a second image of the items in the detection zone; identifying nonstandard items amongst the items from information derived from the first and second images; and isolating the identified nonstandard items in the sorting zone.

In some embodiments, the method comprises spreading the items in the charging zone to form item rows therein, each of the item rows extending substantially transversally to the conveyance direction.

In some embodiments, the method comprises changing an orientation of the items in an item orientation-changing zone of the item carrier, wherein an item portion captured by the first image of at least one of the items is at least partially different from an item portion captured by the second image of said at least one of the items. In some embodiments, the detection zone is dividable into a first detection zone and a second detection zone, located downstream the first detection zone, the first and second images being captured respectively in the first and second detection zones and the item orientation-changing zone being at least partially located between the first and second detection zones. In some embodiments, each of the items has first and second portions and, for at least one of the items, the first image captures the first portion and the second image captures the second portion.

In some embodiments, the item orientation-changing zone is spaced-apart from at least one of the first and second detection zones.

In some embodiments, the item carrier comprises first and second endless chains and rollers extending between the first and second endless chains, each of said rollers comprising an item-contacting surface and being rotatably mounted to the first and second endless chains about a rotating axis substantially perpendicular to the conveyance direction, wherein a combination of an outer portion of the item-contacting surface of the rollers define an item-conveying surface of the item carrier.

In some embodiments, the method comprises engaging in rotation the corresponding rollers about their respective rotating axes in the charging zone. In some embodiments, the outer portion of the item-contacting surface of the corresponding rollers in the charging zone has a charging tangential speed with a direction opposed to the conveyance direction. In some embodiments, the method comprises engaging in rotation the rollers about their respective rotating axes in the item orientation-changing zone. In some embodiments, the outer portion of the item-contacting surface of the corresponding rollers in the item orientation-changing zone has an orientation-changing tangential speed with a direction corresponding to the conveyance direction.

In some embodiments, the sorting system further comprises at least one item-picking system at or proximate to the sorting zone of the item carrier, the isolation of the identified nonstandard items in the sorting zone further comprising providing pickup instructions to said at least one item-picking system, the pickup instructions being derived from the identification of the nonstandard items amongst the items.

In some embodiments, the sorting system further comprises an isolating zone, the method comprising displacing the identified nonstandard items from the sorting zone towards the isolating zone. In some embodiments, the isolating zone is located at least one of above, below and beside the item carrier.

In some embodiments, the method comprises scattering the items prior to the loading thereof in the charging zone. In some embodiments, the item carrier further comprises a scattering zone, located upstream of the charging zone and wherein scattering the items comprises vibrating the items in the scattering zone.

According to another general aspect, there is provided a method for sorting items transported on an item carrier of a sorting system, the item carrier defining a conveyance direction and being dividable along the conveyance direction into a charging zone, a first detection zone, an item orientation-changing zone, a second detection zone and a sorting zone, the method comprising sequentially: loading the items on the item carrier in the charging zone; capturing a first image of the items in the first detection zone; changing an orientation of the items in the item orientation-changing zone, located downstream of the first detection zone; capturing a second image of the items in the second detection zone, located downstream of the first detection zone; identifying nonstandard items amongst the items from information derived from the first and second images; and isolating the identified nonstandard items in the sorting zone.

According to another general aspect, there is provided a method for sorting items transported on an item carrier of a sorting system, the item carrier defining a conveyance direction and having upstream and downstream end portions, the item carrier comprising rollers movable along the conveyance direction from the upstream end portion towards the downstream end portion, the item carrier being dividable along the conveyance direction into a charging zone at the upstream end portion, a first detection zone, an item orientation-changing zone, a second detection zone, longitudinally spaced apart from the first detection zone, and a sorting zone, the method comprising sequentially: loading the items on the item carrier in the charging zone; capturing a first image of the items in the first detection zone; changing an orientation of at least one of the items in the item orientation-changing zone, located downstream of the first detection zone; capturing a second image of the items in the second detection zone, located downstream of the first detection zone; identifying nonstandard items amongst the items from information derived from the first and second images; and isolating the identified nonstandard items in the sorting zone.

In some embodiments, an item portion captured by the first image of at least one of the items is at least partially different from an item portion captured by the second image of said at least one of the items. In some embodiments, each of the items has first and second portions and, for at least one of the items, the first image captures the first portion and the second image captures the second portion. In some embodiments, the item orientation-changing zone is spaced-apart from at least one of the first and second detection zones.

In some embodiments, the method further comprises physically distancing the items from one another in the charging zone. In some embodiments, the method further comprises spreading the items in the charging zone to form item rows therein, each of the item rows extending substantially transversally to the conveyance direction. In some embodiments, the item carrier comprises first and second endless chains and rollers extending between the first and second endless chains, each of said rollers comprising an item-contacting surface and being rotatably mounted to the first and second endless chains about a rotating axis substantially perpendicular to the conveyance direction, wherein a combination of an outer portion of the item-contacting surface of the rollers define an item-conveying surface of the item carrier.

According to another general aspect, there is provided a sorting system for sorting items, the sorting system comprising a first imaging device, a second imaging device, at least one item-picking system and an item carrier for transporting the items along a conveyance direction, the item carrier comprising along the conveyance direction: a charging zone; a detection zone, located downstream of the charging zone, wherein the first and second imaging devices are arranged to capture respectively first and second images of each of the items; and a sorting zone located downstream of the detection zone, wherein the at least one item-picking system is arranged to isolate nonstandard items amongst the items from information derived from the first and second images.

According to another general aspect, there is provided a sorting system for sorting items, the sorting system comprising a first imaging device, a second imaging device, at least one item-isolating system and an item carrier defining a conveyance direction and having upstream and downstream end portions, the item carrier comprising rollers movable along the conveyance direction from the upstream end portion towards the downstream end portions, each roller comprising an item-contacting surface, the item carrier being dividable along the conveyance direction into: a charging zone; a detection zone, located downstream of the charging zone, wherein the first and second imaging devices are longitudinally spaced apart from each other and are arranged to capture respectively first and second images of each of the items in the detection zone; and a sorting zone located downstream of the detection zone, wherein the at least one item-isolating system is arranged to isolate identified nonstandard items amongst the conveyed items from information derived from the first and second images; wherein the sorting system further comprises an item-spreading assembly to spread the items in the charging zone to form item rows therein.

In some embodiments, the detection zone is dividable into a first detection zone and a second detection zone, located downstream the first detection zone, the first and second images being captured respectively in the first and second detection zones. In some embodiments, the item carrier further comprises an item orientation-changing zone between the first and second detection zones, wherein the sorting system further comprises an item orientation-changing assembly to change an orientation of the items in the item orientation-changing zone. In some embodiments, the item orientation-changing zone is spaced-apart from at least one of the first and second detection zones. In some embodiments, the item carrier comprises first and second endless chains and rollers extending between the first and second endless chains, each of said rollers comprising an item-contacting surface having an outer portion and an opposed inner portion and being rotatably mounted to the first and second endless chains about a rotating axis substantially perpendicular to the conveyance direction. In some embodiments, the rollers are independently rotatable from each other about their respective rotating axes. In some embodiments, the item-spreading assembly engages in rotation the corresponding rollers in the charging zone about their respective rotating axes and wherein the outer portion of the item-contacting surface of the corresponding rollers has a charging tangential speed with a direction opposed to the conveyance direction. In some embodiments, the item-spreading assembly comprises an item-spreading device contacting the inner portion of the item-contacting surface of the rollers in the charging zone.

In some embodiments, the item orientation-changing assembly engages in rotation the rollers in the item orientation-changing zone about their respective rotating axes, wherein the outer portion of item-contacting surface of the rollers has an orientation-changing tangential speed with a direction corresponding to the conveyance direction. In some embodiments, the item orientation-changing assembly comprises an item orientation-changing device contacting the inner portion of the item-contacting surface of the rollers in the item orientation-changing zone.

In some embodiments, the sorting system further comprises an isolating zone, the at least one item-picking system displacing the identified nonstandard items from the sorting zone towards the isolating zone. In some embodiments, the isolating zone is located at least one of above, below and beside the item carrier.

In some embodiments, the sorting system further comprises an item-scattering assembly, located upstream of the charging zone of the item carrier. In some embodiments, the item-scattering assembly comprises a vibrating device having an item-receiving surface forming an item-scattering zone.

In some embodiments, the sorting system further comprises a controller comparing the first and second images to one or more predetermined reference images and sending pickup instructions to the at least one item-picking system on the basis of said comparison.

DETAILED DESCRIPTION

Figure 1:
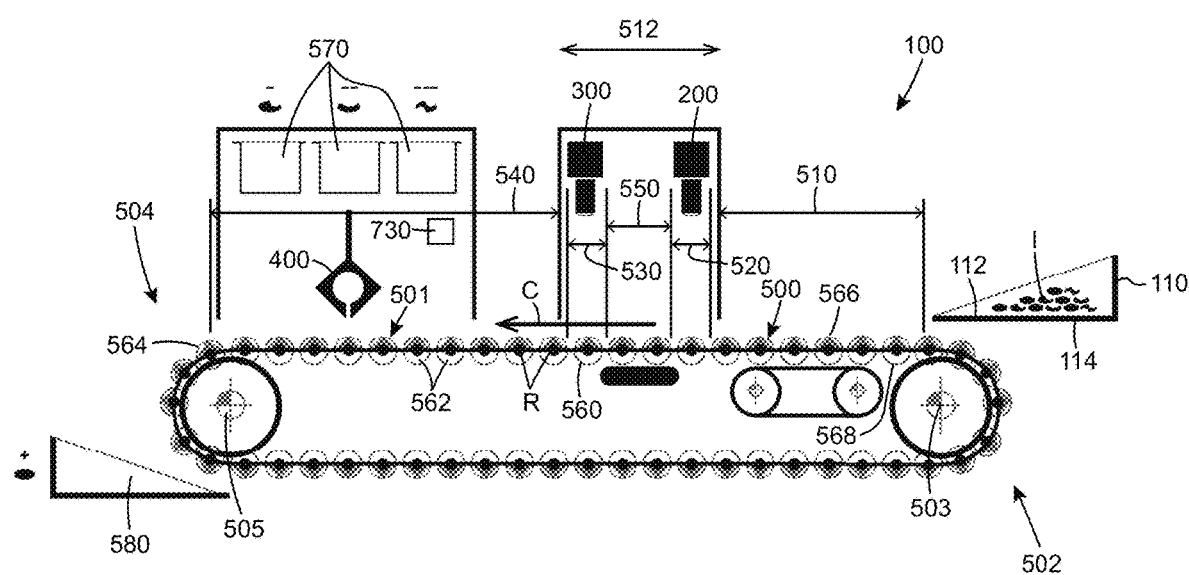
FIG. 1 is a side elevational view of a sorting system in accordance with an embodiment, the sorting system comprising a charging zone, a detection zone, a sorting zone and isolating zones.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only. Moreover, it will be appreciated that positional descriptions such as "above", "below", "forward", "rearward", "left", "right" and the like should, unless otherwise indicated, be taken in the context of the figures only and should not be considered limiting. Moreover, the figures are meant to be illustrative of certain characteristics of the sorting system and are not necessarily to scale.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value. In the following description, an embodiment is an example or implementation. The various appearances of "one embodiment", "an embodiment" or "some embodiments" do not necessarily all refer to the same embodiments. Although various features may be described in the context of a single embodiment, the features may also be provided separately or in any suitable combination. Conversely, although the invention may be described herein in the context of separate embodiments for clarity, it may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments.

It is to be understood that the phraseology and terminology employed herein is not to be construed as limiting and are for descriptive purpose only. The principles and uses of the teachings of the present disclosure may be better understood with reference to the accompanying description, figures and examples. It is to be understood that the details set forth herein do not construe a limitation to an application of the disclosure. Furthermore, it is to be understood that the disclosure can be carried out or practiced in various ways and that the disclosure can be implemented in embodiments other than the ones outlined in the description above. It is to be understood that the terms "including", "comprising", and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference is not to be construed that there is only one of that element. It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. It will be appreciated that the methods described herein may be performed in the described order, or in any suitable order.

Sorting System

Referring now to the drawings, and more particularly to FIG. 1, there is shown a sorting system 100 for sorting items I, such as, and without being limitative, fruits, vegetables, nuts, grains and the like.

In the embodiment shown, the sorting system 100 comprises a first imaging device 200, a second imaging device 300, at least one item-picking system 400 and an item carrier 500 (or item conveyor 500, in the embodiment shown) for transporting the items I along a conveyance direction C.

In the embodiment shown, the item carrier 500 has a conveying speed along the conveyance direction C comprised between about 100 m/s and about 600 m/s.

In the embodiment shown, the item carrier 500 has a conveyance rate along the conveyance direction C comprised between about 500 lb/h and about 3000 lb/h.

In the embodiment shown, as represented in FIG. 1, the item carrier 500 comprises (or is dividable into) along the conveyance direction C into at least a charging zone 510 (for instance a charging and item-spreading zone in the embodiment shown), a detection zone 512 located downstream of the charging zone 510 and a sorting zone 540 located downstream of the detection zone 512. In the embodiment shown, the detection zone 512 is dividable into at least a first detection zone 520 located downstream of the charging and item-spreading zone 510 and a second detection zone 530 located downstream of the first detection zone 520.

The first imaging device 200 is arranged to capture a first image of each of the items I in the first detection zone 520. The second imaging device 300 is arranged to capture a second image of each of the items I in the second detection zone 530. It is understood that the first and second imaging devices 200, 300 could be arranged to take more than one image of each of the items I. The first and second imaging devices 200, 300 could also be arranged to capture videos of the items I in the corresponding one of the first and second detection zones 520, 530. The item-picking system 400 is arranged to isolate nonstandard items NSI amongst the items I from information derived from the first and second images and/or first and second videos. It should be understood that the term "nonstandard" used in the present description should not be understood as being limitative to items having one or more defaults or non-conforming features but designates more broadly items differing from others on the basis of visual aspects. Moreover, the isolated items can either represent a minority or a majority of the sorted items.

It should also be understood that the term "image" should not be limited to a complete visual representation of an exposed surface of the corresponding item but could also comprise one or more lines and/or portions of the items. The identification of nonstandard items can also be carried out using a rebuilt or reconstituted imaging formed by a combination of captured images of the item or of a portion thereof, or a visual representation of sequentially exposed portions of the outer surface of the item. In other words, the term "image" should be understood as a representation of visual information relative to the corresponding item.

As detailed below, the sorting system 100 is shaped and dimensioned so that the first and second imaging devices 200, 300 capture at least partially different first and second images of at least some of the items. In other words, a different portion of at least some of the items is exposed and captured by the first and second images.

As detailed below, in the embodiment shown, the item carrier 500 (the detection zone 512, in the embodiment shown) further comprises (or is further dividable into) an item orientation-changing zone 550 (or item-turning zone 550 or item-flipping zone 550) between the first and second detection zones 520, 530.

As detailed below, even though in the embodiment shown, the different zones of the item carrier are spaced apart and/or distinct from each other, it could also be conceived an item carrier wherein at least some of the different zones thereof would at least partially overlap each other. For instance, the item orientation-changing zone could at least partially overlap at least one of the first and second detection zones. It could also be conceived a sorting system wherein the first and second detection zones and the item orientation-changing zone would at least partially overlap each other so that the items would be flipped and/or displaced and/or turned and/or would have their orientation at least partially modified in the overlapping zone for the first and second images to capture different portions of at least some of the items.

In the embodiment shown, considered along the conveyance direction C, a length of the item orientation-changing zone 550 is equal to or greater than a length of at least one of the first and second detection zones 520, 530.

In the embodiment shown, considered along the conveyance direction C, a length of the charging and item-spreading zone 510 (or charging and row-forming zone 510) is greater than the length of at least one of the first and second detection zones 520, 530 and the item orientation-changing zone 550. For instance, the length of the charging and row-forming zone 510 is equal to or greater than a length of a combination of the first and second detection zones 520, 530 and the item orientation-changing zone 550 inbetween (i.e., the length of the charging and row-forming zone 510 is equal to or greater than a length of the detection zone 512). It could also be conceived a sorting system wherein the length of the charging and row-forming zone would be smaller than the length of the combination of the first and second detection zones and the item orientation-changing zone inbetween and/or smaller than the length of at least one of the first and second detection zones 520, 530 and the item orientation-changing zone.

In the embodiment shown, considered along the conveyance direction C, a length of the sorting zone 540 is greater than the length of at least one of the first and second detection zones 520, 530 and the item orientation-changing zone 550. For instance, the length of the sorting zone 540 is equal to or greater than the length of the combination of the first and second detection zones 520, 530 and the item orientation-changing zone 550 inbetween (i.e., is equal to or greater than the length of the detection zone 512).

In the embodiment shown, the length of the sorting zone 540 is substantially equal to the length of the charging and row-forming zone 510. It could also be conceived a sorting system wherein the length of the sorting zone would not be equal to (for instance would be greater or smaller than) the length of the charging and row-forming zone 510.

It is appreciated that the respective dimensions and the number of the different zones of the item carrier 500 is not limited to the embodiment shown. In other words, the vertical lines of FIG. 1 representing boundaries of the different zones are only indicative and are not limitative.

Moreover, it is appreciated that the shape, the configuration, and the location of the first and second imaging devices 200, 300 can vary from the embodiment shown. It could for instance be conceived a sorting system having a single imaging device that would be displaceable to alternatively capture the first and second images. It could also be conceived a sorting system with a single detection zone, in which the items would be flipped and/or displaced and/or turned and/or would have their orientation at least partially modified so that the first and second images would capture different portions of at least some of the items (i.e. different portions of an outer surface of the at least some of the items).

Item Carrier

Figure 2:
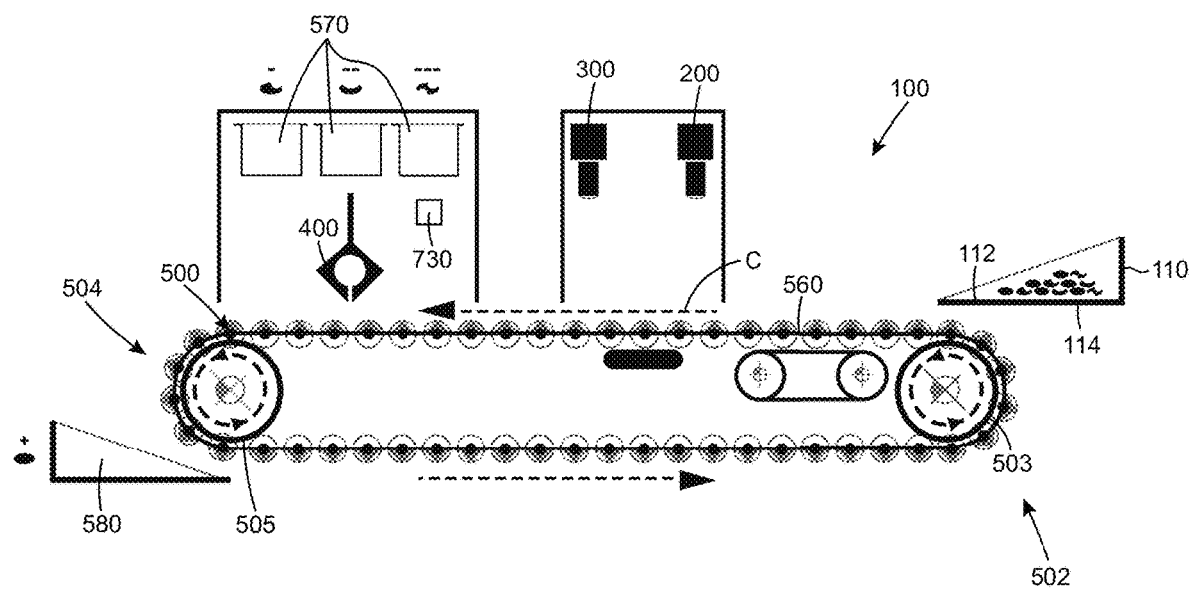
FIG. 2 is another side elevational view of the sorting system of FIG. 1, the sorting system comprising an item carrier for transporting items along a conveyance direction.

In the embodiment shown, the item carrier 500 comprises first and second endless chains 560 (only one of which being represented in the different figures) surrounding spaced-apart upstream and downstream pulleys 503, 505 (FIG. 2). In the embodiment shown, the first and second endless chains 560 form at least partially upstream and downstream end portions 502, 504 of the item carrier 500 and extend from the upstream end portion to the downstream end portion. In the embodiment shown, the charging zone 510 is at the upstream end portion 502 of the item carrier and the sorting zone 540 is at the downstream end portion 504 of the item carrier.

The item carrier 500 further comprises rollers 562 extending between the first and second endless chains 560. Each of the rollers 562 comprises an item-contacting surface 564 having an outer portion 566 and an opposed inner portion 568 and being rotatably mounted to the first and second endless chains 560 about a rotating axis R substantially traversal to the conveyance direction C. In the present description, the outer portion 566 of the item-contacting surface 564 of the rollers 562 is the portion of the roller extending outwardly of a loop defined by the first and second endless chains 560. Consequently, the inner portion 568 of the item-contacting surface 564 of the rollers 562 is the portion of the roller extending inwardly of the loop defined by the first and second endless chains 560. In the embodiment shown, the rotating axis R is substantially perpendicular to the conveyance direction C. Upon actuation of the horizontally spaced-apart upstream and downstream pulleys 503, 505, the first and second endless chains 560 and the rollers 562 are displaced along the conveyance direction C.

It is understood that a combination of the outer portions 566 of the item-contacting surface 564 of the rollers 562, located in an upper portion of the item carrier 500, define together an item-conveying surface 501 of the item carrier 500.

In the embodiment shown, the item-contacting surface 564 of the rollers 562 is at least partially made in a material having adherence properties so as to maintain the items I thereon upon displacement of the item carrier 500 along the conveyance direction C.

It is thus understood that the item carrier 500 and the rollers 562 thereof are shaped and dimensioned to maintain the items I on the item-conveying surface 501 between adjacent rollers 562 upon displacement of the item carrier 500 along the conveyance direction C from the upstream end portion 502 to the downstream end portion 504 thereof.

The maintaining of the items I between adjacent rollers 562 is for instance ensured by the substantially rounded shape of the outer portion 566 of the item-contacting surface 564 of the rollers 562, by a distance between adjacent rollers 562 and by a diameter of the rollers 562. It is understood that the dimensions of the rollers, their relative arrangement and their shape can be modified to be adapted to the shape and dimensions of the items that the item carrier 500 is configured to carry.

In the embodiment shown, each one of the rollers 562 is independently rotatable from each other about their respective rotating axes R. Thus, some of the rollers 562 can be engaged in rotation in a first rotation direction, others can remain stationary, and still others can be engaged in rotation in a second rotation direction, opposed to the first rotation direction, depending on their position along the item carrier 500. In the embodiment shown, each one of the rollers 562 is independently rotatable. However, in an alternative embodiment, they could be groups of adjacent rollers that could be independently rotatable from the other groups of rollers.

It is appreciated that the shape and the configuration of the item carrier, as well as the shape, the dimensions, the number, and the configuration of the rollers thereof can vary from the embodiment shown.

Item-Scattering Zone

Figure 3:
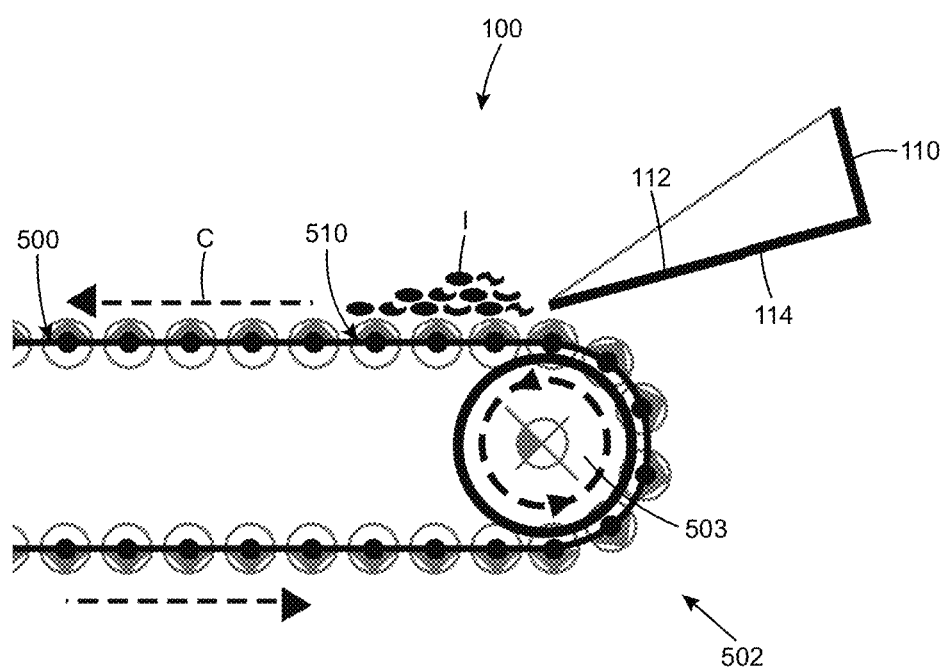
FIG. 3 is an enlarged side elevational view of a section of the sorting system of FIG. 1, the sorting system comprising an item-scattering assembly located upstream of the charging zone.

In the embodiment shown, as best shown in FIG. 3, the sorting system 100 further comprises an item-scattering assembly 110, located upstream of the item carrier 500 (upstream of the charging and row-forming zone 510 of the item carrier 500 in the embodiment shown, i.e., upstream of the upstream end portion 502 of the item carrier 500 in the embodiment shown). For instance, the item-scattering assembly 110 comprises a vibrating device—such as a vibrated hopper or the like—having an item-receiving surface 112 forming an item-scattering zone 114.

In the embodiment shown, the item-scattering assembly 110 is configurable into a scattering configuration (FIG. 2) wherein the items I are arranged on the item-receiving surface 112 thereof, and a loading configuration (FIG. 3) wherein the scattered items I are loaded onto the charging and row-forming zone 510 of the item carrier 500 (i.e., at the upstream end portion 502 of the item carrier 500 in the embodiment shown). In the embodiment shown, the item-scattering assembly 110 is pivotable about an axis substantially transversal to the conveyance direction C to be configured from one of the scattering and loading configurations to the other (i.e., about an axis substantially parallel to the rotating axis R of the rollers 562 in the embodiment shown).

It is appreciated that the shape, the configuration, and the location of the item-scattering assembly can vary from the embodiment shown. It could also be conceived a sorting system with no item-scattering assembly (i.e. wherein the items would be directly loaded onto the charging and row-forming zone 510 of the item carrier 500).

Charging and Item-Spreading Zone

Figure 4:
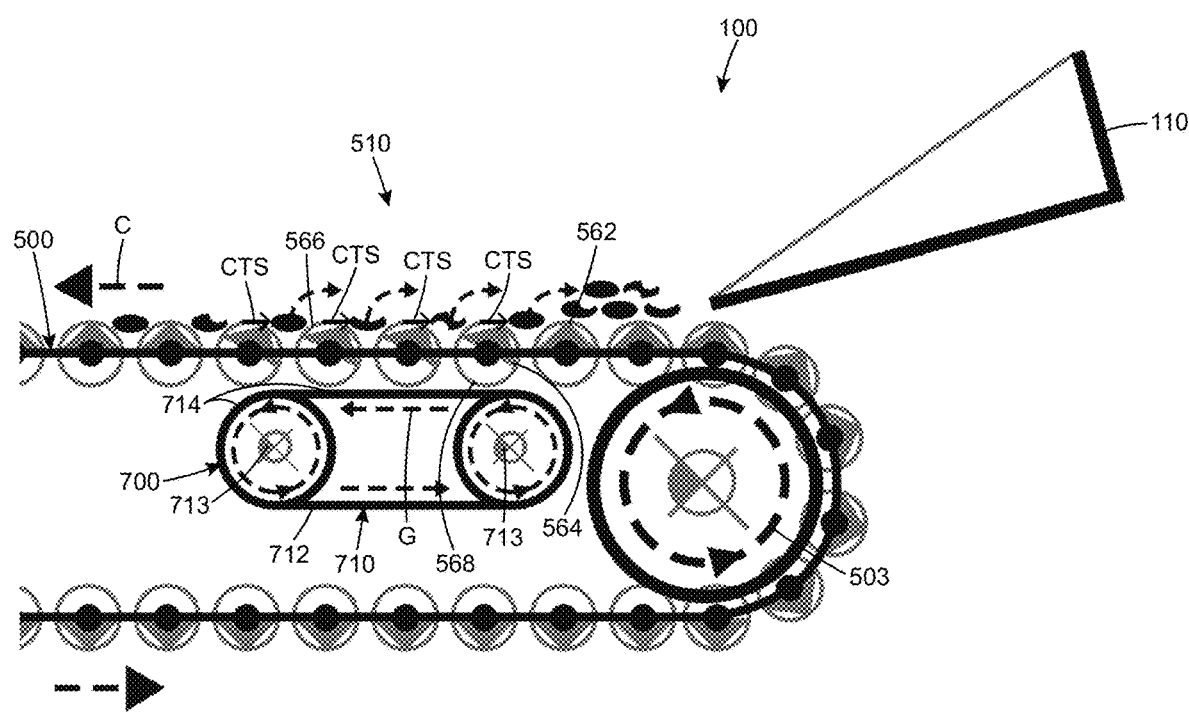
FIG. 4 is an enlarged side elevational view of a section of the sorting system of FIG. 1, the sorting system comprising an item-spreading assembly in the charging zone thereof.

In the embodiment shown, as represented for instance in FIG. 4, the sorting system 100 comprises an item-spreading assembly 700 (or row-forming assembly 700) to physically distance the items from one another in the charging zone 510. In the embodiment shown wherein the item carrier 500 comprises a plurality of rollers and wherein the items are shaped and dimensioned to be received between adjacent rollers, physically distancing the items involves arranging the items for them not to be stacked onto one another and thus inherently creates a plurality of item rows comprising one or more items I in the charging and row-forming zone 510 of the item carrier 500. In other words, the item-spreading assembly 700 is configured to form a plurality of item rows, the rows being formed between adjacent rollers 562. In yet other words, the item rows extend in a direction transversal (substantially perpendicular) to the conveyance direction C, i.e. parallel to a longitudinal axis of the rollers 562 (i.e. parallel to the rotating axis R of the rollers 562). In yet other words, the item-spreading assembly 700 is arranged to guide the items I along a direction transversal to the conveyance direction C.

In the embodiment shown, the item-spreading assembly 700 engages in rotation the rollers 562 located in the charging and item-spreading zone 510 about their respective rotating axes R so that the outer portion 566 of the item-contacting surface 564 of the corresponding rollers 562 has a charging tangential speed CTS (FIG. 4) with a direction opposed to the conveyance direction C, i.e. towards the pulley 503 located adjacent to the item-scattering assembly 110, if any, and within the charging and item-spreading zone 510.

In other words, the item-spreading assembly 700 engages in rotation the corresponding rollers 562 in the charging and item-spreading zone 510 so that the rollers 562 are rotated about their rotating axis R in a direction opposed to a direction allowing the displacement of the items I along the conveyance direction C. In yet other words, as represented in the side elevational view of the sorting system 100 of FIG. 4 wherein the conveyance direction C is directed towards a left end portion of the sorting system 100, the rollers 562 in the charging and item-spreading zone 510 of the item carrier 500 are locally and temporarily rotated about their respective rotating axis R in a clockwise rotation direction. In still other words, the conveyance direction C is determined by the rotation direction of the pulleys 503, 505, which in the non-limitative embodiment shown, are engaged in rotation in the counter clockwise rotation direction. The rollers 562 in the charging and item-spreading zone 510 of the item carrier 500 are locally and temporarily rotated about their respective rotating axis R in a rotation direction opposed to the rotation direction of the pulleys 503, 505, i.e. in the clockwise rotation direction in the non-limitative embodiment shown.

In the embodiment shown, the item-spreading assembly 700 comprises an item-spreading device 710 contacting the inner portion 568 of the item-contacting surface 564 of the rollers 562 in the charging and item-spreading zone 510. For instance, the item-spreading device 710 comprises an item-spreading strap 712 rotatably mounted around one or more guiding pulleys 713 (or guiding wheels 713) located below the inner portion 568 of the item-contacting surface 564 of the rollers 562 in the charging and item-spreading zone 510. In the embodiment shown, an upper portion 714 of the item-spreading strap 712 is displaced along a guiding direction G corresponding to the conveyance direction C in order to engage in rotation the corresponding rollers 562 in the charging and item-spreading zone 510 about their respective rotating axes R so that the charging tangential speed CTS of the outer portion 566 of the item-contacting surface 564 has a rotation direction opposed to the conveyance direction C.

In the embodiment shown, the item-spreading strap 712 has a guiding speed comprised between about 100 m/s and about 1400 m/s along the guiding direction G.

It is appreciated that the shape, the configuration and the location of the item-spreading assembly 700 can vary from the embodiment shown.

Thus, in the non-limitative embodiment shown, a group of rollers 562, located above the item-spreading device 710 is simultaneously engaged in rotation via the item-spreading device 710. However, in an alternative embodiment, at least some of the rollers 562, located in the charging and item-spreading zone 510, could be independently engaged in rotation.

First and Second Detection Zones

As mentioned above, in the embodiment shown, the item orientation-changing zone 550 of the detection zone 512—or item-turning zone or item-flipping zone—is located between the first and second detection zones 520, 530. For instance, the item orientation-changing zone 550 is spaced-apart from at least one of the first and second detection zones 520, 530.

Figure 5:
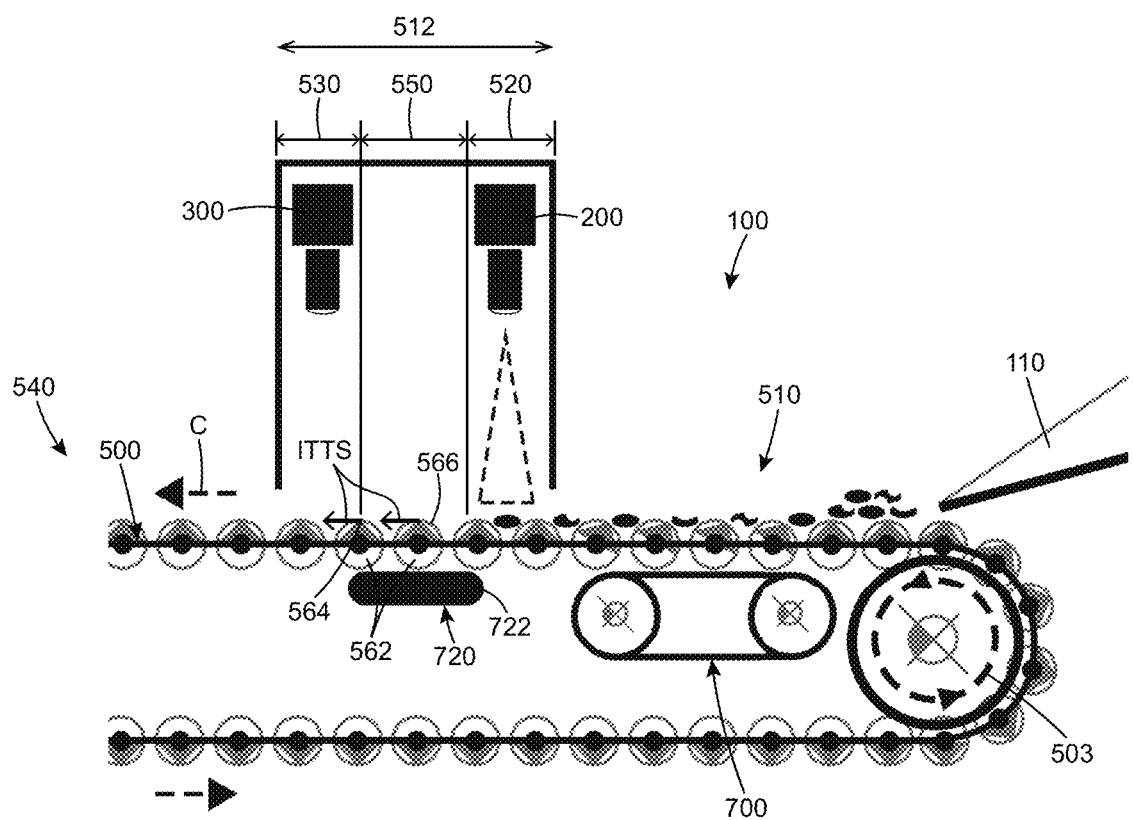
FIG. 5 is an enlarged side elevational view of a section of the sorting system of FIG. 1, the detection zone being dividable into a first detection zone located downstream of the charging zone.
Figure 6:
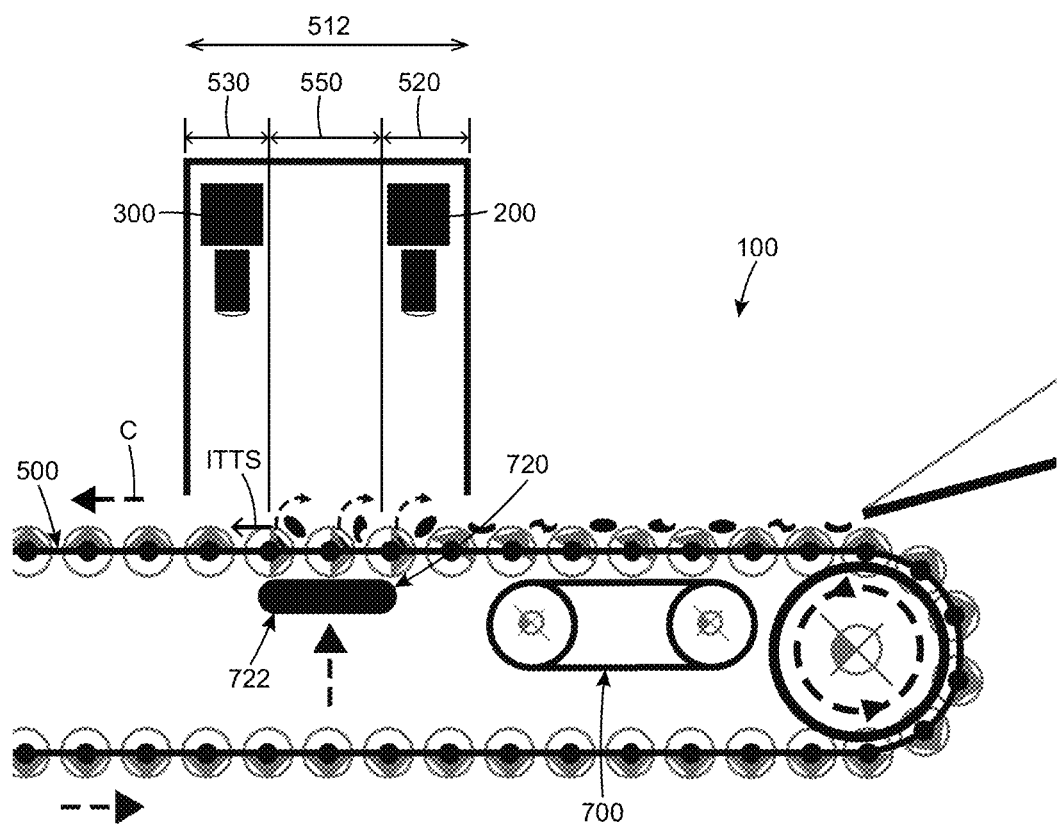
FIG. 6 is an enlarged side elevational view of a section of the sorting system of FIG. 1, the detection zone being further dividable into an item orientation-changing zone located downstream of the first detection zone.
Figure 7:
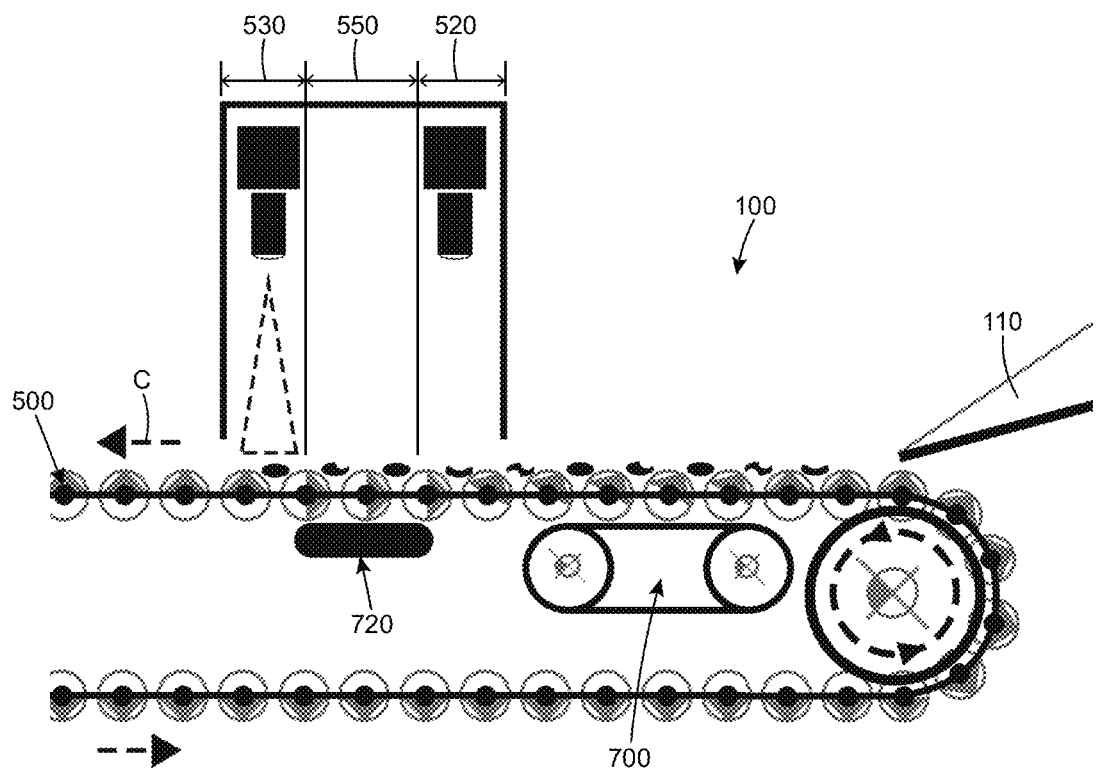
FIG. 7 is an enlarged side elevational view of a section of the sorting system of FIG. 1, the detection zone being further dividable into a second detection zone located downstream of the item orientation-changing zone.

As best shown in FIGS. 5 to 7, the sorting system 100 further comprises an item orientation-changing assembly 720—or item-turning assembly 720 or item-flipping assembly—to flip and/or turn the items I and/or modify an orientation thereof in the item orientation-changing zone 550. In the embodiment shown, the item orientation-changing assembly 720 engages in rotation the rollers 562 in the item orientation-changing zone 550 about their respective rotating axes R, wherein the outer portion 566 of the item-contacting surface 564 of the rollers 562 in the item orientation-changing zone 550 has an orientation-changing tangential speed ITTS with a direction corresponding to the conveyance direction C. In other words, the rollers 562 in the item orientation-changing zone 550 of the item carrier 500 are locally and temporarily rotated about their respective rotating axis R in a rotation direction corresponding to the rotation direction of the pulleys 503, 505, i.e. in the counter-clockwise rotation direction in the non-limitative embodiment shown.

In other words, the item orientation-changing assembly 720 engages in rotation the corresponding rollers 562 in the item orientation-changing zone 550 so that the rollers 562 are rotated about their rotational axis R in a direction corresponding to the direction allowing the displacement of the items I along the conveyance direction C. In yet other words, as represented in the side elevational view of the sorting system 100 of FIG. 6 wherein the conveyance direction C is directed towards the left end portion of the sorting system 100, the rollers 562 in the item orientation-changing zone 550 of the item carrier 500 are locally and temporarily rotated about their respective rotating axis R in a counter clockwise rotation.

For instance, the item orientation-changing assembly 720 comprises an item orientation-changing device 722 (for instance a motorized item orientation-changing device 722, for instance a roller-breaking device 722) contacting the inner portion 568 of the item-contacting surface 564 of the rollers 562 in the item-turning zone 550.

It is understood that by briefly blocking the inner portion 568 of the item-contacting surface 564 of the rollers 562 whereas the rollers 562 are displaced along the conveyance direction C via the endless chains 560, the item orientation-changing device 722 engages in rotation the rollers 562 in the item orientation-changing zone 550 in a direction about their respective rotation axis R wherein the rotation direction of the orientation-changing tangential speed ITTS of the outer portion 566 of the item-contacting surface 564 of the rollers 562 in the item orientation-changing zone 550 corresponds to the conveyance direction C.

For instance, the item orientation-changing assembly 720 is configured so that the item orientation-changing device 722 is alternatively configured in a configuration wherein the item orientation-changing device 722 is spaced apart from the rollers 562 in the item orientation-changing zone 550, and in a configuration wherein the item orientation-changing device 722 is displaced towards the rollers 562 so that the item orientation-changing device 722 (for instance the roller-breaking device 722) contacts the inner portion 568 of the item-contacting surface 564 of the rollers 562 in the item orientation-changing zone 550. In yet other words, the item orientation-changing assembly 720 (for instance the item orientation-changing device 722 thereof) is configured to locally and briefly impede the displacement of the rollers 562 of the item orientation-changing zone 550 along the conveyance direction C, resulting in engaging the rollers 562 in rotation in the item orientation-changing zone 550 in a direction about their respective rotating axis R wherein the rotation direction of the orientation-changing tangential speed ITTS of the outer portion 566 of the item-contacting surface 564 of the rollers 562 in the item orientation-changing zone 550 corresponds to the conveyance direction C.

Thus, in the non-limitative embodiment shown, a group of rollers 562, located above the item orientation-changing device 722 is simultaneously engaged in rotation by being contacted by the item orientation-changing device 722. However, in an alternative embodiment, at least some of the rollers 562, located in the item orientation-changing zone 550, could be independently engaged in rotation.

As detailed below, the item orientation-changing assembly 720 is configured to modify an orientation (or to modify an exposed portion or to substantially turn or displace or flip) at least some of the items I between the first and second detection zones 520, 530. In other words, the item orientation-changing assembly 720 is shaped and dimensioned so that an item portion captured by the first imaging device 200 is at least partially different from an item portion captured by the second imaging device 300.

The sorting system 100 might further comprise at least one stabilizing assembly (not represented) in at least one of the first and second detection zones 520, 530, wherein the stabilizing assembly substantially stops the rotation of the rollers 562 about their respective rotating axes R in the corresponding one of the first and second detection zones 520, 530. The stabilizing assembly might thus contribute to a substantial stabilization of the items I when disposed in the corresponding one of the first and second detection zones 520, 530. The arrangement of items between adjacent rollers of the item carrier and the friction between the items and the item-contacting surface of the rollers might also contribute to the stability of the rollers in the first and second detection zones 520, 530.

It is appreciated that the shape, the configuration and the location of the item orientation-changing assembly 720 can vary from the embodiment shown. It could also be conceived a sorting system without any stabilizing assembly.

Sorting Zone

As mentioned above, the sorting system 100 comprises one or more item-picking systems 400 shaped and dimensioned to pick or displace selected items—nonstandard items NSI, in the embodiment shown—in the sorting zone 540 of the item carrier 500. In other words, in the embodiment shown, the item-picking systems 400 are proximate the downstream end portion 504 of the item carrier.

For instance and without being limitative, the item-picking system 400 (or item-isolating system or item-displacing system) comprises at least one robotic arm, at least one parallel robot, an assembly of connected members or arms, comprising one or more degrees of freedom, at least one controlled or assisted manipulator, a static or moving array of vacuum inlets controlled through a programming language, a static or moving array of suction cups controlled through a programming language, a static or moving array of magnetic members controlled through a programming language, a static or moving array of clamps/clips/fingers/grippers controlled by an automaton or computer, at least one air jet, selectively activated, any controlled electrical pneumatic, mechanical or magnetic device (for instance a controlled lateral pusher) or any other system that is shaped and dimensioned to displace items on the basis of pickup or displacement instructions derived from the identification of the nonstandard items amongst the conveyed items. For instance the item-picking system is controlled through a programming language. In other words, in the embodiment shown, the item-picking system comprises any device shaped and dimensioned to isolate identified nonstandard items amongst the conveyed items from information derived from the captured images upon reception of pickup or displacement instructions to do so.

In the following description without being limitative, the item-picking system 400 will be referred to as an item-picking robot.

In the embodiment shown, the sorting system 100 further comprises a controller 730 operatively connected to the item-picking robot 400. The controller 730 is configured to compare at least one of the first and second images captured respectively by the first and second imaging devices 200, 300 to one or more predetermined conditions—or reference images—and to send pickup instructions to the item-picking robots 400 on the basis of the comparison.

It is appreciated that the shape, the configuration, the number and the location of the item-picking robot 400 can vary from the embodiment shown.

Isolating Zone

Figure 8:
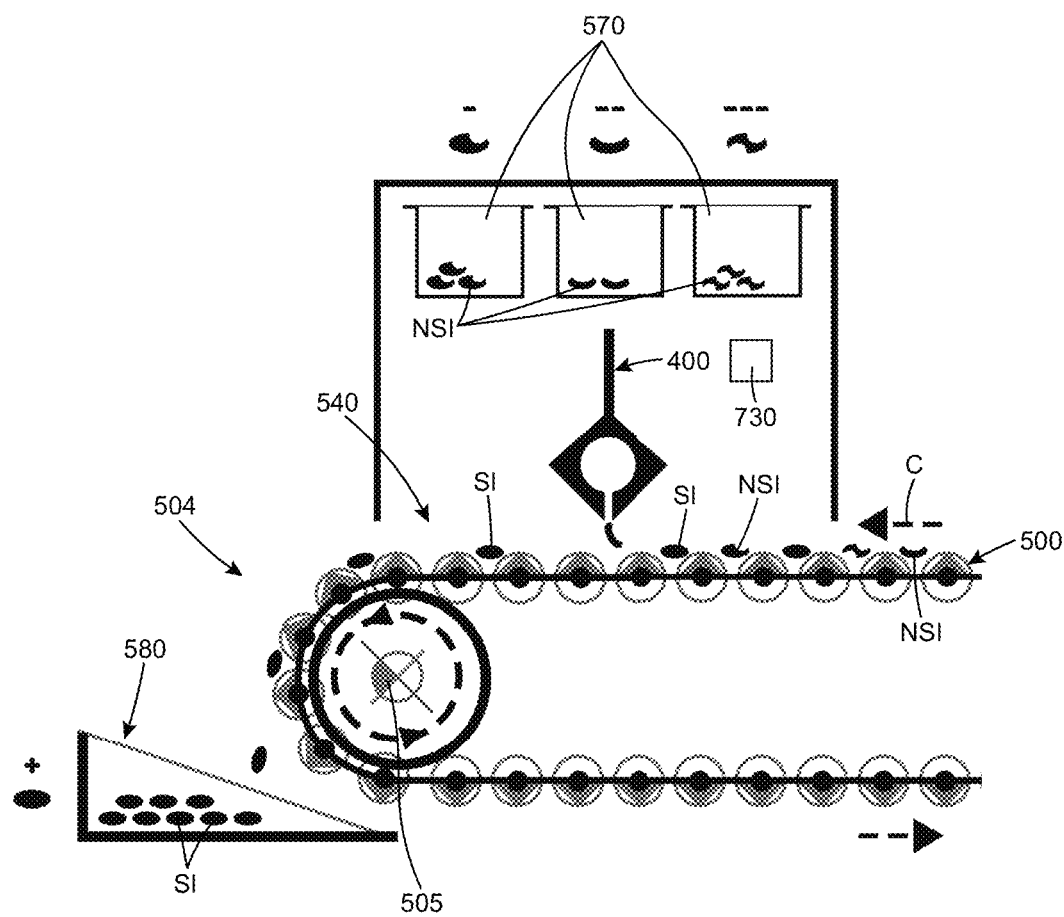
FIG. 8 is an enlarged side elevational view of the sorting system of FIG. 1, the sorting zone and the isolating zones being located downstream of the second detection zone.

As best shown in FIG. 8, the sorting system 100 further comprises one or more isolating zones 570. The item-picking robot 400 is configured to displace the identified nonstandard items NSI from the sorting zone 540 towards the isolating zones 570. For instance, the isolating zones 570 are proximate (for instance above) the downstream end portion 504 of the item carrier.

In the embodiment shown, the sorting system 100 comprises three isolating zones 570 located above the item carrier 500. It is thus understood that the sorting system 100 is configured to sort the items I on the basis of one or more criteria. The isolating zones could be arranged somewhere else with respect to the item carrier 500 (for instance beside the item carrier 500).

It is appreciated that the shape, the configuration, the number and the location of the isolating zones can vary from the embodiment shown. For instance, it could be conceived a sorting system wherein one or more isolating zones would be located below the item carrier. For instance, the sorting system might comprise four or more isolating zones.

The sorting system 100 might further comprise an item-collecting zone 580 (for instance located downstream of the item carrier 500—i.e., downstream the downstream end portion thereof) shaped and dimensioned to collect the standard items SI (i.e. the items remaining on the item-conveying surface 501 of the item carrier 500 after the nonstandard items NSI have been picked by the item-picking robots 400 to be displaced towards the isolating zones 570). For instance, the item-collecting zone 580 is located downstream of the sorting zone 540 (downstream of the item carrier 500 in the embodiment shown).

It is appreciated that the shape, the configuration and the location of the item-collecting zone 580 can vary from the embodiment shown. It could also be conceived a sorting system with no item-collecting zone, wherein the sorting system would be displaced to an appropriated location to directly collect the standard items SI downstream of the sorting zone.

Method for Sorting Items

According to another aspect of the disclosure, there is provided a method 800 for sorting items I transported along a conveyance direction C on an item carrier 500 of a sorting system 100.

The method according to embodiments of the present disclosure may be carried out with a sorting system 100 as the one described above with reference to FIGS. 1 to 8.

Figure 9:
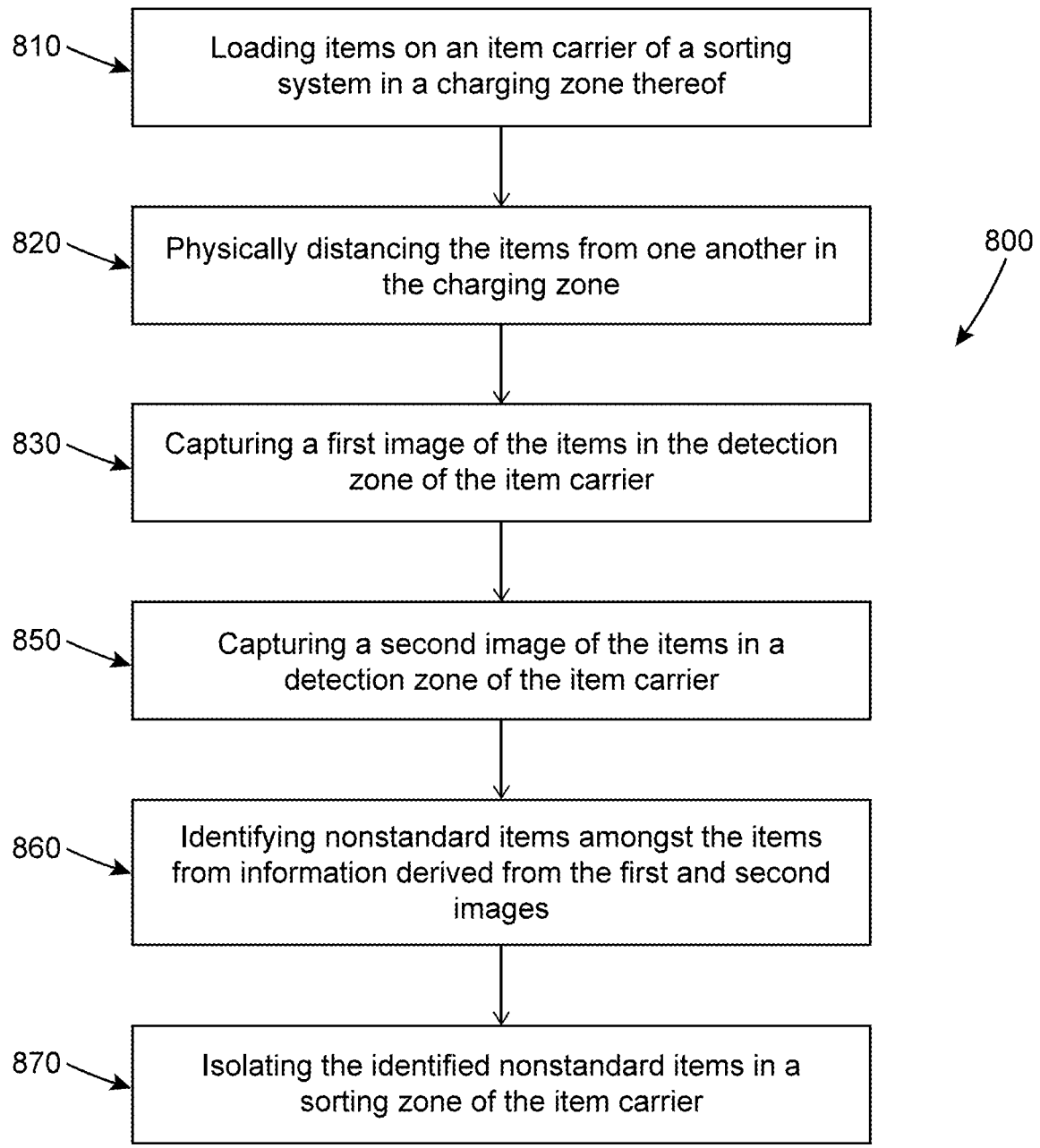
FIG. 9 is a block diagram representing the different steps of a method for sorting items in accordance with a first embodiment.

In accordance with a first embodiment, as best shown in FIG. 9, the method 800 comprises sequentially a step 810 of loading the items I on the item carrier 500 in the charging zone 510 (or charging and item-spreading zone 510); a step 820 of physically distancing the items from one another (for instance forming a plurality of item rows, each of the item rows extending substantially transversally to the conveyance direction C) in the charging zone 510; a step 830 of capturing a first image of the items in a detection zone; a step 850 of capturing a second image of the items in the detection zone; a step 860 of identifying nonstandard items NSI amongst the items I from information derived from the first and second images; and a step 870 of isolating the identified nonstandard items NSI in the sorting zone 540.

In the embodiment shown, the detection zone 512 is dividable into at least the first and second detection zones 520, 530, the second detection zone being located downstream of the first detection zone and the first and second images being captured respectively in the first and second detection zones.

Scattering Zone

In the embodiment shown, the method 800 further comprises a step of scattering the items I prior to the loading thereof in the charging zone 510 (FIG. 3).

For instance, the sorting system 100 comprises a scattering zone 114 (or item-scattering zone 114) located upstream of the item carrier 510 (for instance upstream of the charging zone 510 of the item carrier 500), and the step of scattering the items comprises vibrating the items in the scattering zone 114.

It is understood that the embodiment shown is not limited to a method comprising a step of scattering the items, or wherein the scattering of the items comprises vibrating the items prior to their loading in the charging zone 510.

Charging Zone

In the embodiment shown, the method 800 further comprises a step of spreading the items I in the charging zone 510 (FIG. 4). In other words, the method comprises a step of distributing the items over the charging zone 510 in order to physically distance the items from one another. For instance, the step of spreading the items I in the charging zone 510 comprises engaging in rotation the corresponding rollers 562, i.e. at least some of the rollers 562 located in the charging zone 510, about their respective rotating axes R in the charging zone 510 wherein the outer portion 566 of the item-contacting surface 564 of the corresponding rollers 562 in the charging zone 510 has a charging tangential speed CTS with a direction opposed to the conveyance direction C.

It is understood that the spreading of the items I in the charging zone 510 (i.e., physically distancing the items from one another in the charging zone 510) limits the risk that items I be stacked onto each other, or at least be partially superposed onto each other, so as to ensure that first and second images of the items can properly be captured, downstream, in the first and second detection zones 520, 530 of the detection zone 512.

In other words, in the embodiment shown, the step of spreading the items I in the charging zone 510 (i.e., the step of physically distancing the items from one another in the charging zone) comprises engaging in rotation the rollers 562 in the charging zone 510 about their rotating axis R in a direction opposed to a direction allowing the displacement of the items I along the conveyance direction C.

In the embodiment shown, the charging and the forming of item rows are realized in a single zone of the item carrier 500 (namely the charging and item-spreading zone 510 of the item carrier 500). It could also be conceived an item carrier which would comprise a charging zone and an item-spreading zone that would be distinct and spaced-apart from each other (for instance a charging zone that would be upstream of an item-spreading zone).

First and Second Detection Zones

In the embodiment shown, the method 800 further comprises changing an orientation of the items (for instance flipping the items I) in an item orientation-changing zone 550 of the item carrier 500, which can be located between the first and second detection zones 520, 530, wherein the items I have an item orientation and the item orientation in the first image captured by the first imaging device 200 is different from the item orientation in the second image captured by the second imaging device 300 for at least one of the items (FIG. 6). For instance, the items are flipped and/or turned and/or have their orientation at least partially changed in the item orientation-changing zone so that an item portion of at least one of the items captured by the first image is at least partially different from an item portion of the at least one of the items captured by the second image.

It should be understood that the term orientation is not limited to a direction of an axis of the item but refers more broadly to a position or an arrangement of the item with respect to the item-conveying surface of the item carrier. In other words, at least partially different portions of the item are exposed in the first and second images. It should be understood that the expression "changing an orientation" is not limited to a turnover of the item (i.e. a rotation of the item about an axis thereof of about 180 degrees), but refers to any change in the orientation, the position and/or the relative arrangement of the item with respect to the item-conveying surface of the item carrier. In yet other words, the first and second images provide at least partially different information with respect to an appearance of the corresponding item.

In the embodiment shown, each of the items I has first and second portions and, for at least one of the items, the first image captured by the first imaging device 200 captures the first portion (FIG. 5) and the second image captured by the second imaging device 300 captures the second portion (FIG. 7).

In the embodiment shown, at least some of the items have at least first and second faces corresponding substantially to the first and second portions. In other words, in the embodiment shown, the method comprises capturing images of the first and second faces of at least some of the items I.

In the embodiment shown, the item orientation-changing zone 550 is spaced-apart from at least one of the first and second detection zones 520, 530. In the embodiment shown, the item orientation-changing zone 550 is spaced-apart from the first and second detection zones 520, 530. In the embodiment shown, the item orientation-charging zone 550 and the first and second detection zones 520, 530 form together at least partially the detection zone 512.

The location of the item orientation-changing zone 550 with respect to the first and second detection zones 520, 530 limits the risk that the items be flipped and/or agitated and/or shaken in the first and second detection zones 520, 530, and thus limits the risk that the accuracy and/or the quality of the first and second captured images of the images be jeopardized.

In the embodiment shown, the flipping of the items I in the item orientation-changing zone 550 of the item carrier 500 comprises engaging in rotation the rollers 562 about their respective rotating axes R in the item orientation-changing zone 550, so that the outer portion 566 of the item-contacting surface 564 of the corresponding rollers 562 in the item orientation-changing zone 550 has an item orientation-changing tangential speed ITTS with a direction corresponding to the conveyance direction C.

The method 800 might further comprise substantially stopping the rotation of the rollers 562 about their respective rotating axes R in at least one of the first and second detection zones 520, 530. For instance, the method 800 might further comprise substantially stopping the rotation of the rollers 562 about their respective rotating axes R in the first and second detection zones 520, 530.

It is thus understood that the stopping of the rotation of the rollers 562 in the first and second detection zones 520, 530 would contribute to easing the capturing of the first and second images and to the quality of the first and second captured images of the items I.

It is appreciated that the shape, the configuration, and the location of the first and second detection zones and the item orientation-changing zone can vary from the embodiment shown. It could for instance be conceived a method comprising capturing more than two images of the items in more than two detection zones.

Sorting Zone

In the embodiment shown, the sorting system 100 further comprises at least one item-picking robot 400 at or proximate to the sorting zone 540 of the item carrier 500. The step 870 of isolating the identified nonstandard items NSI in the sorting zone 540 further comprises providing pickup instructions to the item-picking robot 400, the pickup instructions being derived from the identification of the nonstandard items NSI amongst the items.

Isolating Zone

In the embodiment shown, the sorting system 100 further comprises one or more isolating zones 570 (three in the embodiment shown). The method 800 comprises displacing the identified nonstandard items NSI from the sorting zone 540 towards the isolating zone 570 (FIG. 8). In the embodiment shown, the isolating zones 570 are located above the item carrier 500. The number and location of the isolating zones 570 is obviously not limited to the embodiment shown.

It is understood that the identification of the nonstandard items NSI from information derived from the first and second images captured by the first and second imaging devices 200, 300 allows an efficient sorting of the items I loaded on the item carrier 500. As represented in FIG. 8, depending on the quality and the number of images of the items I captured by the first and second imaging devices 200, 300, one or more sorting criteria can be applied to the items I.

The method 800 might further comprise collecting the standard items SI in an item-collecting zone 580 located downstream of the sorting zone 540 (downstream of the item carrier 500 in the embodiment shown).

It is appreciated that the method for sorting items I can vary from the embodiment shown.

For instance, whereas in the present disclosure, the nonstandard items NSI are picked by the item-picking robot 400, it could also be conceived a method wherein the standard items SI would be picked up by the item-picking robot to be displaced towards the isolating zones 570, whereas the nonstandard items NSI would remain on the item-conveying surface 501 of the item carrier 500.

Figure 10:
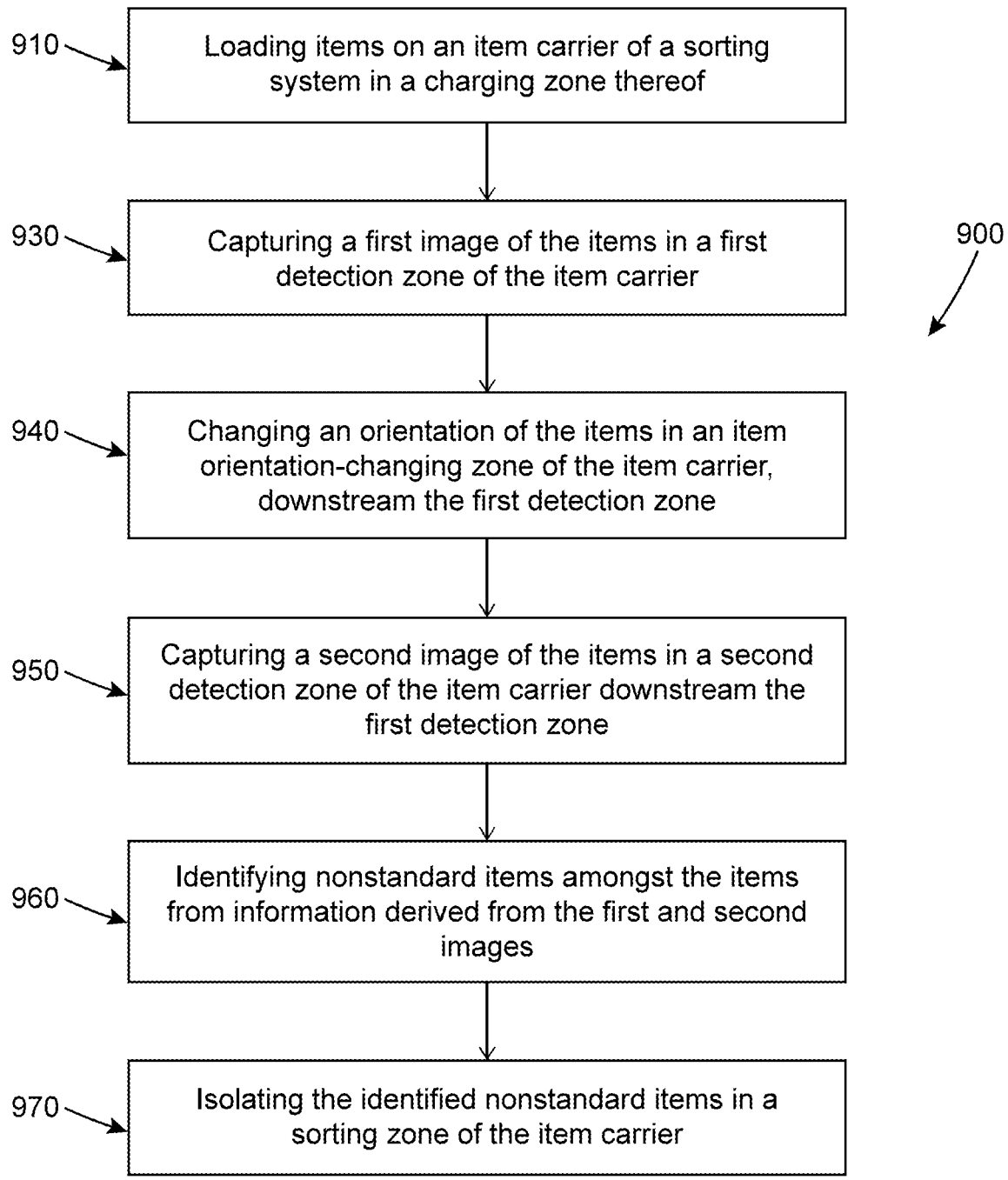
FIG. 10 is a block diagram representing the different steps of a method for sorting items in accordance with a second embodiment.

In accordance with another embodiment, as best shown in FIG. 10, the method 900 comprises sequentially a step 910 of loading the items I on the item carrier 500 in the charging zone 510; a step 930 of capturing a first image of the items I in the first detection zone 520; a step 940 of changing an orientation of the items in the item orientation-changing zone 550, located downstream of the first detection zone 520; a step 950 of capturing a second image of the items in the second detection zone 530, located downstream of the first detection zone (for instance, downstream of the item orientation-changing zone 550). The method 900 further comprises a step 960 of identifying nonstandard items NSI amongst the items from information derived from the first and second images; and a step 970 of isolating the identified nonstandard items NSI in the sorting zone 540. In other words, it could be conceived a method which would not comprise forming a plurality of item rows, for instance in the charging zone 510 of the item carrier 500.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited by the scope of the appended claims.

The invention claimed is:

1. A method for sorting items transported on an item carrier of a sorting system, the item carrier defining a conveyance direction and being dividable along the conveyance direction into a charging zone, a first detection zone, a second detection zone, an item orientation-changing zone spaced-apart from at least one of the first and second detection zones, and a sorting zone, the method comprising sequentially:
   loading the items on the item carrier in the charging zone;
   physically distancing the items from one another in the charging zone to form item rows therein, each of the item rows extending substantially transversally to the conveyance direction;
   capturing a first image of the items in the first detection zone;
   changing an orientation of the items in the item orientation-changing zone;
   capturing a second image of the items in the second detection zone;
   identifying nonstandard items amongst the items from information derived from the first and second images; and
   isolating the identified nonstandard items in the sorting zone.

2. The method according to claim 1, wherein a first item portion of at least one of the items captured by the first image is at least partially different from a second item portion of said at least one of the items captured by the second image.

3. The method according to claim 1, wherein the item carrier comprises upstream and downstream end portions and upstream and downstream pulleys respectively at the upstream and downstream end portions, the item carrier further comprising at least one endless chain surrounding the upstream and downstream pulleys and rollers movable along the conveyance direction from the upstream end portion towards the downstream end portion, each of said rollers comprising an item-contacting surface and being rotatably mounted to said at least one endless chain about a rotating axis substantially perpendicular to the conveyance direction, wherein a combination of an outer portion of the item-contacting surface of the rollers define an item-conveying surface of the item carrier.

4. The method according to claim 3, further comprising engaging in rotation the corresponding rollers about their respective rotating axes in the charging zone, wherein the outer portion of the item-contacting surface of the corresponding rollers in the charging zone has a charging tangential speed with a direction opposed to the conveyance direction.

5. The method according to claim 3, further comprising engaging in rotation the rollers about their respective rotating axes in the item orientation-changing zone, wherein the outer portion of the item-contacting surface of the corresponding rollers in the item orientation-changing zone has an orientation-changing tangential speed with a direction corresponding to the conveyance direction.

6. The method according to claim 1, wherein the sorting system further comprises at least one item-isolating system at or proximate to the sorting zone of the item carrier, the isolation of the identified nonstandard items in the sorting zone further comprising providing isolation instructions to said at least one item-isolating system, the isolation instructions being derived from the identification of the nonstandard items amongst the items and wherein the sorting system further comprises an isolating zone, the method comprising displacing the identified nonstandard items from the sorting zone towards the isolating zone.

7. A method for sorting items transported on an item carrier of a sorting system, the item carrier defining a conveyance direction and having upstream and downstream end portions, the item carrier comprising rollers movable along the conveyance direction from the upstream end portion towards the downstream end portion, the item carrier being dividable along the conveyance direction into a charging zone at the upstream end portion, a first detection zone, an item orientation-changing zone, a second detection zone, longitudinally spaced apart from the first detection zone, and a sorting zone, the method comprising sequentially:
 loading the items on the item carrier in the charging zone;
 capturing a first image of the items in the first detection zone;
 changing an orientation of at least one of the items in the item orientation-changing zone, located downstream of the first detection zone, by engaging in rotation the rollers about their respective rotating axes with an orientation-changing tangential speed in a direction corresponding to the conveyance direction;
 capturing a second image of the items in the second detection zone, located downstream of the first detection zone, following changing the orientation of the at least one of the items;
 identifying nonstandard items amongst the items from information derived from the first and second images; and
 isolating the identified nonstandard items in the sorting zone.

8. The method according to claim 7, wherein the item orientation-changing zone is spaced-apart from at least one of the first and second detection zones.

9. The method according to claim 7, further comprising physically distancing the items from one another in the charging zone to form item rows therein, each of the item rows extending substantially transversally to the conveyance direction.

10. The method according to claim 7, wherein the item carrier further comprises upstream and downstream pulleys respectively at the upstream and downstream end portions, and at least one endless chain surrounding the upstream and downstream pulleys, wherein each of said rollers comprises an item-contacting surface and is rotatably mounted to said at least one endless chain about a rotating axis substantially perpendicular to the conveyance direction, wherein a combination of an outer portion of the item-contacting surface of the rollers define an item-conveying surface of the item carrier.

11. The method according to claim 10, further comprising engaging in rotation the corresponding rollers about their respective rotating axes in the charging zone, wherein the outer portion of the item-contacting surface of the corresponding rollers in the charging zone has a charging tangential speed with a direction opposed to the conveyance direction.

12. The method according to claim 7, wherein the sorting system further comprises at least one item-isolating system at or proximate to the sorting zone of the item carrier, the isolation of the identified nonstandard items in the sorting zone further comprising providing isolation instructions to said at least one item-isolating system, the isolation instructions being derived from the identification of the nonstandard items amongst the items and wherein the sorting system further comprises an isolating zone, the method comprising displacing the identified nonstandard items from the sorting zone towards the isolating zone.

13. A sorting system for sorting items, the sorting system comprising a first imaging device, a second imaging device, at least one item-isolating system, an item orientation-changing assembly, and an item carrier defining a conveyance direction and having upstream and downstream end portions, the item carrier comprising rollers movable along the conveyance direction from the upstream end portion towards the downstream end portion, each roller comprising an item-contacting surface, the item carrier being dividable along the conveyance direction into:
 a charging zone;
 a detection zone, located downstream of the charging zone, and dividable into a first detection zone and a second detection zone, wherein the first and second imaging devices are longitudinally spaced apart from each other and are arranged to capture respectively first and second images of each of the items respectively in the first and second detection zones;
 an item orientation-changing zone located between the first and second detection zones, wherein the item orientation-changing assembly is configured to change an orientation of the items in the item orientation-changing zone; and
 a sorting zone located downstream of the detection zone, wherein the at least one item-isolating system is arranged to isolate identified nonstandard items amongst the conveyed items from information derived from the first and second images;
 wherein the sorting system further comprises an item-spreading assembly to spread the items in the charging zone to form item rows therein.

14. The sorting system according to claim 13, wherein the item carrier further comprises upstream and downstream pulleys respectively at the upstream and downstream end portions, and at least one endless chain surrounding the upstream and downstream pulleys, wherein the rollers are rotatably mounted to said at least one endless chain about a rotating axis substantially perpendicular to the conveyance direction, wherein the rollers are independently rotatable from each other about their respective rotating axes and wherein the item-spreading assembly engages in rotation the corresponding rollers in the charging zone about their respective rotating axes and wherein an outer portion of the item-contacting surface of the corresponding rollers has a charging tangential speed with a direction opposed to the conveyance direction.

15. The sorting system according to claim 13, wherein the item orientation-changing assembly engages in rotation the rollers in the item orientation-changing zone about their respective rotating axes, wherein the outer portion of the item-contacting surface of the corresponding rollers has an orientation-changing tangential speed with a direction corresponding to the conveyance direction.

16. The sorting system according to claim 13, further comprising an isolating zone located at least one of above, below and beside the item carrier, the at least one item-isolating system displacing the identified nonstandard items from the sorting zone towards the isolating zone.

17. The sorting system according to claim 13, further comprising a controller comparing the first and second images to one or more predetermined reference images and sending isolation instructions to the at least one item-isolating system on the basis of said comparison.

* * * * *